May 26, 1953  B. PEARLMAN  2,639,582
MOUNT FOR REACTION MOTORS
Filed Dec. 7, 1950  2 Sheets-Sheet 1

INVENTOR
BERNARD PEARLMAN

BY *William R. Wright Jr.*
AGENT

May 26, 1953 B. PEARLMAN 2,639,582
MOUNT FOR REACTION MOTORS
Filed Dec. 7, 1950 2 Sheets-Sheet 2

INVENTOR
BERNARD PEARLMAN

BY
AGENT

Patented May 26, 1953

2,639,582

UNITED STATES PATENT OFFICE 2,639,582

MOUNT FOR REACTION MOTORS

Bernard Pearlman, Morristown, N. J., assignor to Reaction Motors, Inc., Rockaway, N. J., a corporation of New Jersey Application December 7, 1950, Serial No. 199,673

6 Claims. (Cl. 60—35.55)

The present invention relates to a novel and useful mounting structure for the propulsive unit of air, land or water vehicles, and more particularly to those vehicles which are propelled by the thrust of a power-driven propeller or by a reaction motor which creates thrust by the rapid expulsion of a mass of fluid. It relates to a mounting structure for a reaction motor in a vehicle such as an aircraft or missile wherein the thrust of the reaction motor is used for both propulsion and steering.

The principal object of the present invention is to provide a mount for a reaction motor wherein the thrust of the reaction motor can be made to exert itself in any desired direction within the limits of a spherical segment determined by the physical dimensions of the propulsive unit, and which mounting means will, at the same time, carry through its structure any necessary fuel and oxidizer to the reaction motor.

A further object of the present invention is to provide a mounting means for a reaction motor which will permit changes in the direction of the thrust exerted by the motor, which will be sufficiently strong to withstand the application of the thrust forces and the forces of shock and vibration from the motor, and which will, at the same time, eliminate any need for separate flexible fuel and oxidizer conduits by carrying these fluids to the reaction motor through the hollow interior of the mount itself, thus providing a more practical, less expensive and more dependable arrangement.

The present invention is not limited to use in an aircraft, a missile, or a submersible, but is particularly useful as a mount for such vehicles since its universal action permits steering of the vehicle in any direction, be it in a horizontal or vertical plane or any combination of the two.

Other objects and advantages of the present invention will become apparent from the general and detailed description which follows.

It is known that steering of a propeller or jet driven vehicle can be accomplished by changing the resultant direction of the thrust exerted by the vehicle's propulsive unit. Steering in this manner becomes very important in the case of jet propelled high altitude missiles, for they are intended to operate where the air is so rarefied as to make ordinary aerodynamic control surfaces ineffective. Furthermore, the weight and complexity of an aerodynamic control system can be saved to a large extent if a means is provided to steer by changes in the direction of thrust of the propulsive unit. A difficult problem arises, however, in the matter of carrying fuel to the motor since the motor must be swung in both the horizontal and vertical planes and combinations thereof. This becomes further complicated if the propulsion unit is a rocket motor requiring not only a fuel supply line but an oxidizer supply line as well.

The present invention solves this problem by the provision of a motor mount which permits freedom of change in thrust direction and supplies fuel and oxidizer through the hollow interior of the motor mount itself, thereby eliminating any necessity for flexible supply lines.

Figure 1:
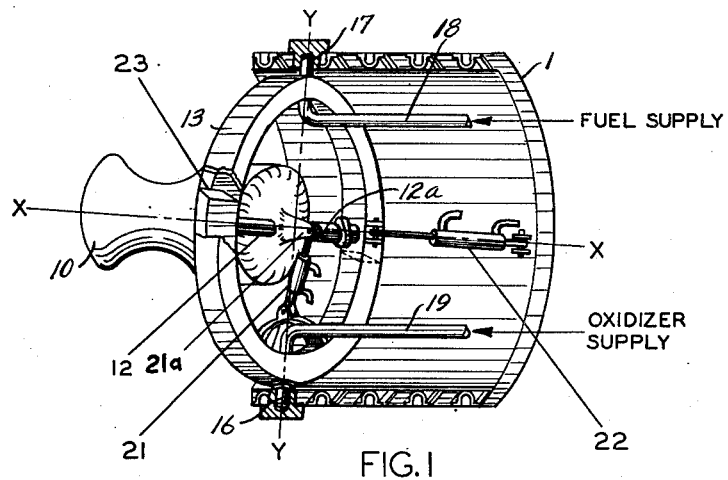
Figure 1 is a perspective view of the mount showing a reaction motor of the rocket type mounted in the tail of an aircraft or missile.

The present invention is illustrated in Figure 1 where a rocket motor is mounted, by means of the present invention, in the tail of an aircraft or missile. From the figure it can be seen that the rocket motor as mounted can be swung about both horizontal transverse axis X—X and vertical axis Y—Y or any desired combination of these within the limits of the physical dimensions of the device. It is apparent from the figure, however, that the motor can be swung through a segment of a sphere which is entirely adequate for sufficient changes in thrust direction to provide for all steering needs of the aircraft or missile. For most practical steering purposes, only a small change in direction of the reaction motor is necessary to produce a large turning moment about the center of gravity of the vehicle being propelled. For instance, if the motor creates a propulsive thrust of 10,000 pounds and the line of thrust is directed within one inch of the center of gravity, a turning moment of 10,000 inch pounds is created. Since most aircraft or missiles utilizing a 10,000 pound thrust rocket motor would necessarily be large, their centers of gravity would be some distance from the motor and, therefore, only a small angularity of the center line of thrust with the center line of the vehicle would be required to produce such a turning moment to steer the relatively lightweight vehicle.

In Figure 1 is shown a portion of a typical lightweight vehicle structure 1 having hollow propellant manifold 13 attached to it at two points by means of journals or pivots 16 which are located at opposite sides of the manifold on a diametral axis thereof. The figure shows this to be the vertical axis, but it is not necessarily so although it will be referred to hereafter in this specification as the Y—Y axis. Attached to the interior surface of manifold 13 and concentric with the intersection of diametral axis X—X with that surface, are propellant conduits 12 and 12a for fuel and oxidizer respectively. These conduits are free to rotate on axis X—X at their points of attachment to manifold 13, are bent to a 90° elbow shape, and at their other ends are rigidly but communicably attached to rocket motor 10. Since axis X—X is perpendicular to axis Y—Y in the plane of the manifold, a gimbal is created where a universal change in direction of the propulsive jet of the rocket motor is made possible, the extent of the motion in any direction being dependent upon the physical dimensions of the motor itself as well as those of the gimbal.

The arrangement of a member pivoted to a structure for rotation on the pivotal axis combined with a second member pivoted to the first on a pivotal axis perpendicular to the first axis so that the second member is movable in a substantially universal manner, is here defined as a gimbal.

Figure 2:
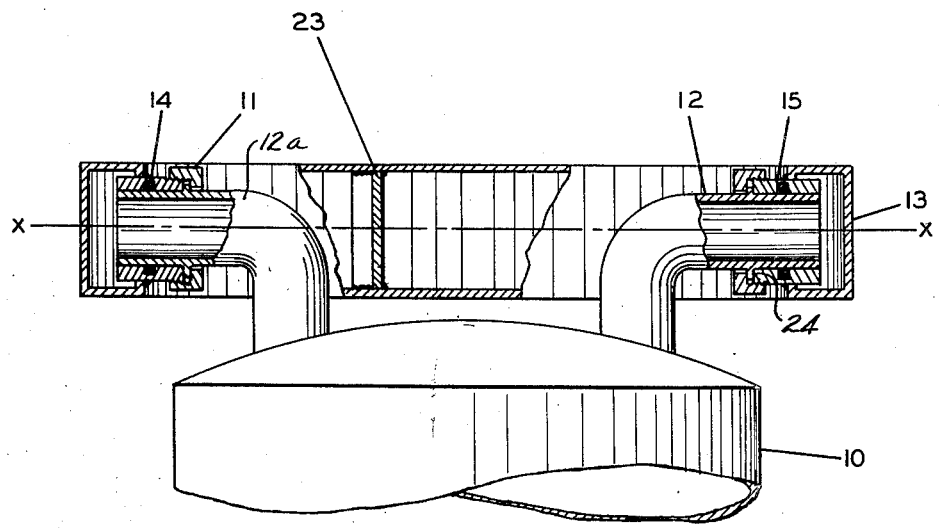
Figure 2 is a cross sectional view taken on axis X—X of Figure 1 showing the manner in which the rocket motor is mounted on the manifold.

As pointed out in the preceding paragraph, rocket motor 10 is connected to annular hollow manifold or gimbal ring 13 by propellant conduits 12 and 12a which are fixedly attached to motor 10 but are attached to manifold or hollow ring 13 in a pivotal manner coincident with axis X—X as shown in Figure 2. From the figure, it can be seen that manifold outlet conduit 12 communicates with the interior of manifold 13 entering the manifold through sleeve bearing or hollow pivot 15, which is itself welded in place in manifold 13. A resilient circular seal 14 is located in a groove in sleeve 15 to provide a sealing effect and thus prevent leakage of propellant. A lip 24 is provided as an integral part of conduit 12 and serves to prevent motion of conduit 12 with respect to manifold 13 along axis X—X. Cap 11 is threaded to sleeve 15 and has a hole in it large enough to allow conduit 12 to pass through it but small enough to engage lip 24, this cap being provided to act as an additional means for preventing motion of conduit 12 in other than a rotary manner and to provide a means of slight adjustment for the degree of freedom of rotation of the conduit in its sleeve. Conduit 12a is communicably attached to manifold 13 in the same manner.

It will be evident from the figure that the rocket motor 10 can be rotatably swung about axis X—X, the horizontal axis, to provide for steering in the vertical plane.

Figure 3:
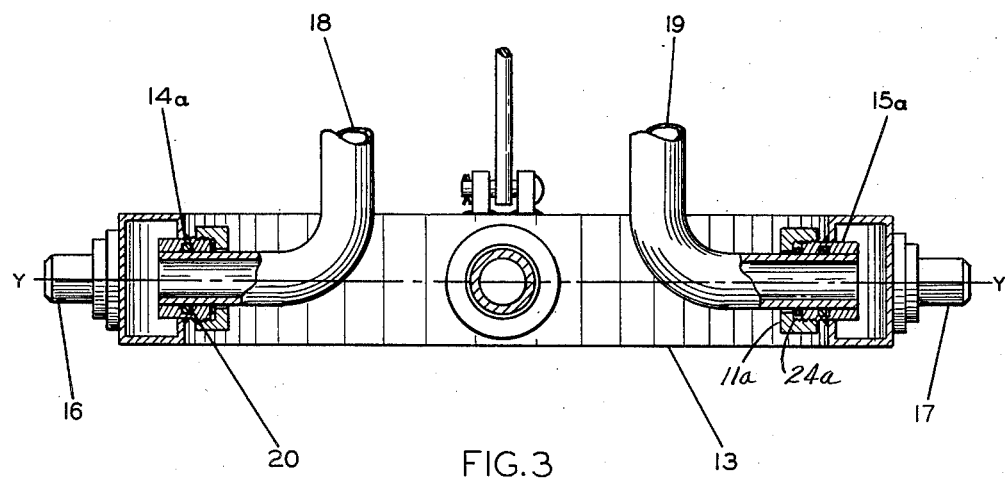
Figure 3 is a cross sectional view taken on axis Y—Y of Figure 1 showing the pivotal mountings, the manifold and the propellant feed line connections.

Reference again to Figure 1 will show axis Y—Y as a vertical axis perpendicular to axis X—X. A cross sectional view of the motor mount is shown in Figure 3 taken through the mount on axis Y—Y, where will be seen pivots or journals 16 and 17 coaxial with axis Y—Y, and propellant manifold inlet conduits 18 and 19 which enter manifold 13 coaxially with the journals as shown, passing through pivotal sleeves 15a and communicating with the interior of manifold 13. Sleeves 15a are welded in place and have a circular resilient seal 14a set in groove 20 to act as a seal to prevent leakage of the propellant as it passes from the conduits into the manifold. A cap 11a and lip 24a act to hold conduit 19 in place in the same manner that cap 11 and lip 24 act to restrain conduit 12 as previously described. Conduit 18 is also restrained in this manner. It will be evident from the figure that the manifold can be rotated about diametral axis Y—Y thus swinging the motor in a horizontal plane for steering in that plane.

Walls 23 are located within manifold 13 at two places in order to divide the interior of manifold 13 into two hollow portions to segregate propellants in the manner shown in Figure 1. Although these walls are shown diametrically opposite to one another in Figure 1, they may be placed in other locations if it is desirable to provide unequal hollow portions within the manifold as might be the case where certain propellants are used in a mixture ratio which makes it necessary to provide a larger quantity of one propellant than the other. The walls must, however, be placed so that only one inlet and one outlet conduit are connected to each of the hollow portions of the manifold.

The motor and gimbal can either be locked in a desired position by tightening of caps 11 and 11a or they can be moved by actuators, either of the hydraulic or pneumatic cylinder and strut type, or by electrical means. Hydraulic cylinders 21 and 22 are shown used for this purpose in Figure 1. Cylinder 21 is connected at one end to the structure of the manifold and at its other end to horn 21a attached to the head end of the motor in such a manner that extension or contraction of the strut by the application of hydraulic fluid to the hydraulic cylinder results in movement of horn 21a and rotation of the reaction motor about the axes of its inlet conduits, i. e., the outlet conduits of the manifold. The manifold itself is made to rotate about its axis Y—Y by extension or contraction of hydraulic cylinder and strut 22. It is important here that the fixed end of cylinder 21 be attached to manifold 13 at a point lying on axis Y—Y, and the fixed end of cylinder 22 to the vehicle's structure at a point lying on axis X—X. If these are not so located, the freedom of motion of the motor mount becomes restricted due to binding in the attachment fittings of these actuators.

While there have been shown and described and pointed out the fundamental novel features of this invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A motor mount for a reaction motor comprising a pivoted hollow manifold to which said reaction motor is communicably attached by at least one hollow pivot, the longitudinal central axis of said hollow pivot being substantially perpendicular to the pivotal axis of said manifold, and at least one conduit communicably attached to said manifold, whereby propellant fed through said conduit will pass through said manifold and hollow pivot into said reaction motor.

2. A motor mount for a reaction motor comprising a hollow ring to which said reaction motor is communicably attached by hollow pivots, pivots for said hollow ring located on its exterior and on a diametral axis of said ring which is substantially perpendicular to the axis of the said hollow pivots, and at least one conduit communicably attached to said hollow ring whereby propellant fed through said conduit will pass through said hollow ring and hollow pivots into said reaction motor.

3. A motor mount for a reaction motor comprising a pivoted hollow manifold to which said reaction motor is communicably attached by hollow pivots, the longitudinal central axis of said hollow pivots being substantially perpendicular to the pivotal axis of said manifold, means for supplying propellants to the interior of said manifold, and means for segregating said propellants within said manifold.

4. A motor mount for a reaction motor comprising a pivoted hollow ring to which said reaction motor is communicably attached by hollow pivots, the longitudinal central axis of said hollow pivots being substantially perpendicular to the pivotal axis of said hollow ring, means for supplying propellants to the interior of said hollow ring, walls within said hollow ring dividing said hollow ring into two hollow portions such that communication is afforded between one inlet conduit and one outlet conduit through each of the said hollow portions of the ring, and actuating means for moving the motor and ring to various positions by rotation about their respective axes.

5. A reaction motor mounting device comprising an annular hollow manifold pivoted for rotation on a diametral axis of said manifold, conduits pivotally attached to said manifold coaxially with the said diametral axis and through which at least one propellant is carried to the interior of said manifold, conduits communicably and pivotally attached at one end to said manifold coaxially with a diametral axis which is subtantially perpendicular to the first diametral axis and at their other ends fixedly but communicably attached to said reaction motor, at least one hydraulic actuator hinged to said motor at a distance from the motor's pivotal axis and at its other end hinged to said manifold at a point on the pivotal axis of said manifold, and means for moving said manifold about its pivotal axis.

6. A reaction motor mounting device comprising an annular hollow ring pivoted for rotation on a diametral axis of said manifold, inlet conduits pivotally attached to said hollow ring coaxially with the said diametral axis and through which propellants are carried to the interior of said hollow ring, walls within said hollow ring for segregating the propellants, outlet conduits communicably and pivotally attached at one end to said hollow ring coaxially with that diametral axis which is perpendicular to the first diametral axis and at their other ends fixedly but communicably attached to said reaction motor to conduct the segregated propellants to the reaction motor, and means for rotatively moving said motor and hollow ring about their respective pivotal axes.

BERNARD PEARLMAN.

References Cited in the file of this patent

UNITED STATES PATENTS

| Number | Name | Date |
|---|---|---|
| 2,086,545 | Fator | July 13, 1937 |
| 2,407,852 | Smith | Sept. 17, 1946 |
| 2,422,744 | O'Neil | June 24, 1947 |
| 2,493,043 | Stipsky | Jan. 3, 1950 |